United States Patent
Hong

(10) Patent No.: US 12,349,019 B2
(45) Date of Patent: Jul. 1, 2025

(54) BEAM SWITCHING METHOD AND APPARATUS, AND NETWORK DEVICE, TERMINAL AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 33 days.

(21) Appl. No.: 18/003,895

(22) PCT Filed: Jul. 31, 2020

(86) PCT No.: PCT/CN2020/106072
§ 371 (c)(1),
(2) Date: Dec. 29, 2022

(87) PCT Pub. No.: WO2022/021271
PCT Pub. Date: Feb. 3, 2022

(65) Prior Publication Data
US 2023/0269643 A1    Aug. 24, 2023

(51) Int. Cl.
*H04K 1/10* (2006.01)
*H04B 7/0408* (2017.01)
*H04L 5/00* (2006.01)
*H04L 27/28* (2006.01)
*H04W 36/08* (2009.01)

(52) U.S. Cl.
CPC ........ *H04W 36/085* (2023.05); *H04B 7/0408* (2013.01); *H04L 5/0048* (2013.01)

(58) Field of Classification Search
CPC ............ H04W 36/085; H04W 36/0072; H04B 7/0408; H04L 5/0048
USPC .......................... 375/260, 284, 285, 296, 346
See application file for complete search history.

(56) References Cited

U.S. PATENT DOCUMENTS

2013/0121185 A1    5/2013    Li et al.
2022/0225421 A1*   7/2022    Miao ................. H04W 36/0072

FOREIGN PATENT DOCUMENTS

| CN | 1832621 A | 9/2006 |
|---|---|---|
| CN | 107888245 A | 4/2018 |
| CN | 108024385 A | 5/2018 |
| CN | 109417415 A | 3/2019 |
| CN | 110178409 A | 8/2019 |
| CN | 111867136 A | 10/2020 |
| WO | 2019133049 A1 | 7/2019 |

* cited by examiner

*Primary Examiner* — Phuong Phu
(74) *Attorney, Agent, or Firm* — McCoy Russell LLP

(57) ABSTRACT

A beam switching method includes: a network device sending a network device beam switching information to a terminal according to position information and channel measurement information of the terminal, where the beam switching information includes information of a beam switching requirement and/or a destination beam.

20 Claims, 3 Drawing Sheets

Sends, by a network device, beam switching information to a terminal according to position information and channel measurement information of the terminal — 201

BEAM SWITCHING METHOD AND APPARATUS, AND NETWORK DEVICE, TERMINAL AND STORAGE MEDIUM

CROSS REFERENCE TO RELATED APPLICATION

The present application is a U.S. National Phase of International Application No. PCT/CN2020/106072 entitled "BEAM SWITCHING METHOD AND APPARATUS, AND NETWORK DEVICE, TERMINAL AND STORAGE MEDIUM," and filed on Jul. 31, 2020. The entire contents of each of the above-listed applications are hereby incorporated by reference for all purposes.

BACKGROUND

Beam-based switching is performed on different carriers or bandwidth part (BWP) before and after switching. After terminal switching, beam measurement reporting cannot be performed on resources before switching.

SUMMARY

The present disclosure relates to the beam switching technology, and in particular to a beam switching method and apparatus, and a network device, a terminal and a storage medium.

According to a first aspect of the embodiments of the present disclosure, there is provided a beam switching method, including:
  sending, by a network device, beam switching information to a terminal according to position information and channel measurement information of the terminal, where the beam switching information includes information of a beam switching requirement and/or a destination beam.

According to a second aspect of the embodiments of the present disclosure, there is provided a beam switching method, including:
  receiving, by a terminal, beam switching information sent by a network device, and performing switching based on information of a beam switching requirement and/or a destination beam in the beam switching information; and
  sending, by the terminal, information of successful switching of the destination beam to the network device through the switched destination beam or reserved resources of the destination beam.

According to a third aspect of the embodiments of the present disclosure, there is provided a network device, including a processor, a transceiver, a memory, and executable programs stored in the memory and may be run by the processor, where when the executable programs are run by the processor, the steps of the beam switching method according to the first aspect of the embodiments of the present disclosure are implemented.

According to a fourth aspect of the embodiments of the present disclosure, there is provided a terminal, including a processor, a transceiver, a memory, and executable programs stored in the memory and may be run by the processor, where when the executable programs are run by the processor, the steps of the beam switching method according to the second aspect of the embodiments of the present disclosure are implemented.

According to a fifth aspect of the embodiments of the present disclosure, there is provided a non-transitory computer-readable storage medium storing executable programs, where when the executable programs are executed by a processor, the steps of the beam switching method are implemented.

DESCRIPTION OF DRAWINGS

The accompanying drawings are incorporated into the specification and constitute a part of the specification, show embodiments consistent with the present disclosure, and are used to explain the principle of the embodiments of the present disclosure together with the specification.

DETAILED DESCRIPTION OF EMBODIMENTS

Embodiments will be described in detail here, and examples are shown in the accompanying drawings. When the following descriptions refer to the figures, the same numbers in different figures indicate the same or similar elements, unless otherwise indicated. The implementations described in the following examples do not represent all implementations consistent with the embodiments of the present disclosure. Instead, they are merely examples of apparatuses and methods consistent with some aspects of the embodiment of the present disclosure as detailed in the appended claims.

The terms used in the embodiments of the present disclosure are only for the purpose of describing specific embodiments, and are not intended to limit the embodiments of the present disclosure. The terms "a/an", "said", and "the" in the singular form used in the embodiments of the present disclosure and the appended claims are also intended to include the plural form, unless otherwise clearly indicated in the context. It should be further understood that the term "and/or" used in the present disclosure refers to and includes any or all possible combinations of one or more of the associated listed items.

It should be understood that although the terms 'first', "second", "third", etc. may be used in the embodiments of the present disclosure to describe various information, the information should not be limited to these terms. These terms are merely used to distinguish the same type of information from one another. For example, without departing from the scope of the embodiments of the present disclosure, the first information may also be referred to as second information, and similarly, the second information may also be referred to as first information. Depending on the context, the word "if" as used here may be interpreted as "when" or "upon" or "in response to determining".

Figures 1, 2:
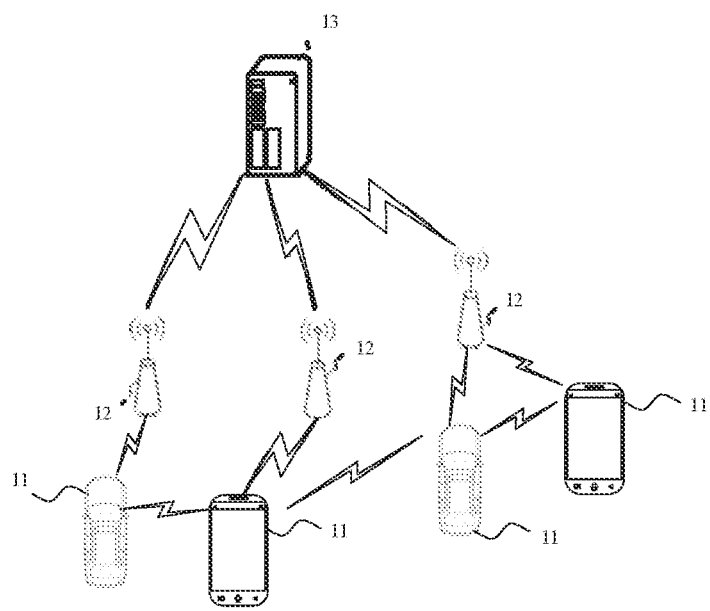
FIG. 1 is a schematic structural diagram of a radio communication system according to an example.
FIG. 2 is a schematic flowchart of a beam switching method according to an example.

Referring to FIG. 1, it shows a schematic structural diagram of a radio communication system according to an embodiment of the present disclosure. As shown in FIG. 1, the radio communication system is a communication system based on a cellular mobile communication technology and may include: a plurality of terminals 11 and a plurality of base stations 12.

The terminal 11 may refer to a device for providing voice and/or data connectivity for a user. The terminal 11 may be in communication with one or more core networks via a radio access network (RAN), and the terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted apparatus. For example, a station (STA), a subscriber unit, a subscriber station, a mobile station, a mobile table, a remote station, an access point, a remote terminal, an access terminal, a user terminal, a user agent, user device, or a user equipment (UE). Or the terminal 11 may also be an unmanned aerial vehicle device. Or the terminal 11 may also be a vehicle-mounted device, for example, may be a trip computer having a radio communication function, or may be a radio communication device connected to the trip computer externally. Or the terminal 11 may also be a roadside device, for example, may be a street lamp having the radio communication function, a signal light, or other roadside devices.

The base station 12 may be a network side device in the radio communication system. The radio communication system may be the 4th generation mobile communication technology (4G) system, also referred to as a long term evolution (LTE) system; or, the radio communication system may also be a 5G system, also referred to as a new radio (NR) system or a 5G NR system. Or the radio communication system may also be any generation system. An access network in the 5G system may be referred to as a new generation-radio access network (NG-RAN). Or an MTC system.

The base station 12 may be an evolved base station (eNB) used in the 4G system. Or the base station 12 may also be a base station using a centralized distribution architecture (gNB) in the 5G system. When the base station 12 uses the centralized distribution architecture, a central unit (CU) and at least two distributed units (DU) are included usually. The central unit is provided with protocol stacks of a packet data convergence protocol (PDCP) stratum, a radio link control (RLC) protocol stratum, and a media access control (MAC) stratum; and the distributed unit is provided with a protocol stack of a physical (PHY) stratum, and the embodiments of the present disclosure do not limit the specific implementations of the base station 12.

Radio connection between the base station 12 and the terminal 11 may be established by means of a radio air interface. In different implementations, the radio air interface is a radio air interface based on the 4th generation mobile communication network technology (4G) standard, or the radio air interface is a radio air interface based on the 5th generation mobile communication network technology (5G) standard, for example, the radio air interface is a new radio; or the radio air interface may also be a radio air interface based on a further next generation mobile communication network technology standard of 5G.

In some embodiments, end to end (E2E) connection may further be established between the terminals 11. For example, scenarios such as vehicle to vehicle (V2V) communication, vehicle to infrastructure (V2I) communication, and vehicle to pedestrian (V2P) communication in vehicle to everything (V2X) communication.

In some embodiments, the above radio communication system further includes a network management device 13.

A plurality of base station 12 are connected with the network management device 13 respectively, where the network management device 13 may be a core network device of the radio communication system, for example, the network management device 13 may be a mobility management entity (MME) in an evolved packet core network (EPC), or the network management device may also be other core network devices, such as a serving gateway (SGW), a public data network gateway (PGW), a policy and charging rules function (PCRF) unit, or a home subscriber server (HSS). The embodiments of the present disclosure do not limit an implementation form of the network management device 13.

Implementing subjects to which the embodiments of the present disclosure relate include, but are not limited to: user equipment (UE) in a cellular mobile communication system, and a base station for cellular mobile communication, etc.

For one thing, switching on different frequency resources requires a certain time and consumes time and power, and for another, it is not ensured that channel quality after switching meets communication requirements. For beam switching, a corresponding switching mechanism needs to be set to adapt to the beam-based switching scenario.

The embodiments of the present disclosure provide a beam switching method and apparatus, and a network device, a terminal and a storage medium.

FIG. 2 is a schematic flowchart of a beam switching method according to an example. As shown in FIG. 2, the beam switching method according to the embodiments of the present disclosure includes the following processing steps:

Step 201: sends, by a network device, beam switching information to a terminal according to position information and channel measurement information of the terminal. In another example, the network device may send switching information to the terminal according to other information.

The beam switching information includes information of a beam switching requirement and/or a destination beam. In the embodiments of the present disclosure, in response to determining that the beam switching information includes information of the beam switching requirement but does not include information of the destination beam, switching can be performed according to information of frequency band supported by the terminal or information of beam frequency band acquired through measurement detection. Certainly, in response to determining that the beam switching information includes information of the destination beam, switching directly to the destination beam is performed.

According to a beam switching method and apparatus, a network device, a terminal and a storage medium of the embodiments of the present disclosure, the terminal is enabled to perform switching based on a destination beam in beam switching information by sending the beam switching information to the terminal, and the terminal and the network device are enabled to perform switching successfully or not through information of resources reserved for the destination beam, so that it is ensured that the efficiency of beam switching is relatively high, and the switching success rate is also greatly improved, so as to ensure that a service during a switching process is not affected by the switching.

In the embodiments of the present disclosure, the network device includes a base station, a relay station, a remote radio unit, etc. and may also include a satellite serving as an access station or an access relay, etc. and may also include a central control center in an unmanned aerial vehicle system, etc.

In the embodiments of the present disclosure, the position information of the terminal may be reported by the terminal to the network device, or the network device determines the position of the terminal based on a communication signal with the terminal, or the network device determines the position of the terminal based on information of a cell accessed by the terminal, and signal transmission reverse direction, etc.

In the embodiments of the present disclosure, in response to determining that the network device receives information, sent by the terminal, of successful switching of the destination beam, the network device releases channel resources occupied by the terminal before switching to the destination beam. Here, the channel resources occupied before switching to the destination beam include source beam resources occupied by the terminal and communicated with the network device before switching, and also include reserved communication resources specifically reserved for the terminal and related to the destination beam in a switching process, where the terminal and the network device interact each other for switching information through these reserved channel resources in a switching process, for example, the terminal may send information about whether the switching is successful to the network device by using the reserved communication resources.

In the embodiments of the present disclosure, the beam switching information further includes information of channel resources reserved for the destination beam. In this way, the relevant information of the destination beam is sent directly to the terminal, so that the terminal establishes a connection directly to the network device based on the relevant information of the destination beam, so as to complete the switching. The channel resources reserved for the destination beam may be used to transceive resource information after beam switching.

When the information of the destination beam includes information of two or more destination beams, the priority is set for the two or more destination beams, so that according to the priority of the beams, the terminal first performs switching to the beam with the highest priority, and performs switching to the sub-priority beam when the switching fails, until the switching is successful or all the destination beams are attempted to switch.

In the embodiments of the present disclosure, the network device receives information of successful switching of the destination beam through the reserved channel resources. As an implementation, the network device determines information of the channel resources reserved for the destination beam according to at least one of service information of the terminal and resource occupation information of the destination beam. For example, according to service bandwidth occupation before the terminal switching, a destination beam suitable for the current service of the terminal is selected for the terminal, so that the current service is not affected by the beam switching after the terminal completes the switching. In response to determining the destination beam for the terminal, it is also considered that the destination beam is occupied, that is, the remaining bandwidth of the destination beam is able to support the quality requirements for service communication of the terminal.

In the embodiments of the present disclosure, as an implementation, the network device may also broadcast, through a broadcast channel, information of channel resources respectively reserved for a plurality of beams supported by the network device; so as to enable the terminal to receive, through a broadcast message, the information of channel resources respectively reserved for the plurality of beams supported by the network device, so that the beam switching information sent by the network device to the terminal may not have to include information of the channel resources reserved for the destination beam, and the terminal may determine information of the reserved channel resources corresponding to the destination beam according to the destination beam. In this way, the network device receives information of successful switching of the destination beam through the reserved channel resources. As another implementation, information of a plurality of beams supported by the network device and information of channel resources reserved for the plurality of beams may also configured in the terminal in advance, for example, the information of the plurality of beams supported by the network device and information of channel resources reserved for the plurality of beams are configured in the terminal before the terminal leaves the factory. In this case, the information of the beam and the reserved channel resources can be agreed in a protocol.

In the embodiments of the present disclosure, as an implementation, the network device may also receives information of successful switching of the destination beam through the destination beam. For example, the network device may receive information of successful switching of the destination beam through the channel resources non-reserved for the destination beam. That is, after successfully switches to the destination beam, the terminal may send information of successful switching of the destination beam directly to the network device through the switched destination beam; or after receiving the service information sent by the terminal through the destination beam, the network device determines that the terminal successfully switches to the destination beam.

In the embodiments of the present disclosure, the network device releases the channel resources reserved for the destination beam in response to determining that the terminal does not switch again within a preset duration after the terminal switches to the destination beam.

In the embodiments of the present disclosure, the information of the destination beam at least includes one of: carrier information of the destination beam, BWP information, and identification information of the destination beam.

Figure 3:
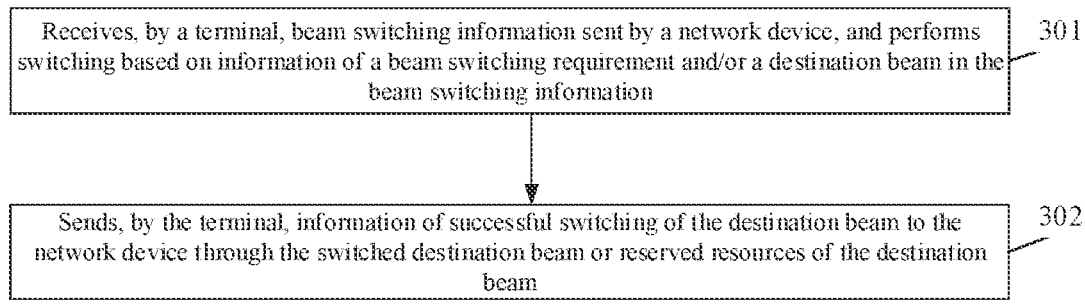
FIG. 3 is a schematic flowchart of a beam switching method according to an example.

FIG. 3 is a schematic flowchart of a beam switching method according to an example. As shown in FIG. 3, the beam switching method according to the embodiments of the present disclosure includes the following processing steps:

Step 301: receives, by a terminal, beam switching information sent by a network device, and performs switching based on information of a beam switching requirement and/or a destination beam in the beam switching information.

In the embodiments of the present disclosure, in response to determining that the beam switching information includes information of the beam switching requirement but does not include information of the destination beam, switching can be performed according to information of frequency band supported by the terminal or information of beam frequency band acquired through measurement detection. In response to determining that the beam switching information includes information of the destination beam, switching directly to the destination beam is performed.

In response to determining that the information of the destination beam includes information of two or more destination beams, switching to the destination beam is performed based on the priority of the two or more destination beams, or switching to one of the two or more destination beams randomly is performed.

Step 302: sends, by the terminal, information of successful switching of the destination beam to the network device through the switched destination beam or reserved resources of the destination beam.

In the embodiments of the present disclosure, information of the reserved channel resources is carried in the beam switching information. Alternatively, the terminal receives, through a broadcast message of the network device, information of channel resources respectively reserved for all beams supported by the network device. Alternatively, the terminal is configured with information of all beams supported by the network device and information of channel resources reserved for all beams. For example, the information may be defined in a protocol.

The following further explains the essence of technical solutions of the present disclosure by means of specific examples.

In a conventional cellular network, frequency resources occupied by different beams are the same, and the terminal does not need to switch frequency points or bandwidths during measuring, that is, the base station does not need to allocate additional resources to the terminal separately for terminal reporting. However, for a dense area, in order to ensure that the base station schedules more users, the base station would use a manner of frequency division multiplexing, that is, different frequency resources are used by a plurality of beams. Particularly in a satellite communication system, in that the coverage area of a single satellite is very wide and the number of scheduled users is very large, in order to ensure the performance of the system, different beams achieve coverage by using different frequency resources.

According to the embodiments of the present disclosure, a base station sends a beam switching requirement to a terminal according to position information and channel measurement information reported by the terminal, and indicates switching information of the destination beam and reserved transceiving resource information after terminal switching; after receiving a message from the base station, the terminal starts switching to a carrier or BWP where the destination beam is located; and in response to determining that channel state of the destination beam is relatively good, communication is performed on the reserved resources of the destination beam, and it is indicated to the base station that switching has been completed. After receiving information of successful switching on a new beam or performing measurement, the base station releases the resources, occupied by the terminal, of the source beam.

In the embodiments of the present disclosure, the beam information refers to beam carriers or BWP information, and a base station may directly indicate information of the destination beam directly to a terminal so that the terminal directly switches to the destination beam; or the base station may directly send the beam index information and the terminal beam index information to the terminal; and according to a corresponding relationship between a previously configured beam index and a beam, the information of the destination beam indicated by the base station is determined. The corresponding relationship between the beam index and the beam previously configured by the terminal may be received through a system broadcast message, or may be previously configured in the terminal according to the protocol stipulation.

In an embodiment, dedicated resource information reserved on the frequency resources corresponding to each beam is used to transceive information after the terminal switches. The terminal has known the resource information in advance, for example, as specified in the standard, or obtained by broadcast information from the base station. In response to determining that no other terminal switches to the destination beam for more than a certain time period, that is, the message of successful switching of the destination beam is not received within a preset duration, the dedicated resource information reserved for the destination beam is released. For example, by setting a timer, in an embodiment, the start time may be started as the base station sends a switching requirement to the terminal. In another embodiment, the timing can be started according to the terminal sending switching requirement plus the BWP switching capability reported by the terminal, such as the time needed to switch BWP.

In the embodiments of the present disclosure, it is judged that the channel state of the destination beam is relatively good; and in an embodiment, it can be considered that the channel state of the destination beam is relatively good in response to determining that the measured reference signal receiving power (RSRP) is greater than a preset value, and the terminal is indicated to switch to the destination beam. In another embodiment, in response to determining that the RSRP value of the destination beam exceeding the RSRP value of the original beam reaches a preset threshold, the channel state of the destination beam is considered to be relatively good, and the terminal is indicated to switch to the destination beam.

In another embodiment, in response to determining that the base station indicates more than one destination beam, the priority, that is, the order of switching the destination beam, may be indicated according to the situation. Alternatively, the terminal randomly selects a destination beam for switching.

Figure 4:
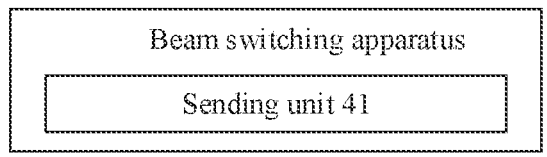
FIG. 4 is a schematic structural diagram of a configuration of a beam switching apparatus according to an example.

FIG. 4 is a schematic structural diagram of a configuration of a beam switching apparatus according to an example. As shown in FIG. 4, the beam switching apparatus according to the embodiments of the present disclosure includes:

a sending unit 41, configured to send beam switching information to a terminal according to position information and channel measurement information of the terminal, where the beam switching information includes information of a beam switching requirement and/or a destination beam.

On the basis of the beam switching apparatus shown in FIG. 4, the beam switching apparatus according to the embodiments of the present disclosure further includes:

a receiving unit (not shown in FIG. 4), configured to receive information, sent by the terminal, of successful switching of the destination beam; and a releasing unit (not shown in FIG. 4), configured to release channel resources occupied by the terminal before switching to the destination beam.

In an embodiment, the beam switching information further includes information of channel resources reserved for the destination beam.

In an embodiment, the receiving unit is further configured to:

receive information of successful switching of the destination beam through the reserved channel resources.

On the basis of the beam switching apparatus shown in FIG. 4, the beam switching apparatus according to the embodiments of the present disclosure further includes:

a determination unit (not shown in FIG. 4), configured to determine information of channel resources reserved for the destination beam according to at least one of service information of the terminal and resource occupation information of the destination beam.

On the basis of the beam switching apparatus shown in FIG. 4, the beam switching apparatus according to the embodiments of the present disclosure further includes:

a broadcast unit (not shown in FIG. 4), configured to broadcast, through a broadcast channel, information of channel resources respectively reserved for a plurality of beams supported by the apparatus; and the receiving unit, further configured to receive information of successful switching of the destination beam through the reserved channel resources.

On the basis of the beam switching apparatus shown in FIG. 4, the beam switching apparatus according to the embodiments of the present disclosure further includes: a configuration unit (not shown in FIG. 4); and the receiving unit, further configured to:

receive information of successful switching of the destination beam through the channel resources reserved for the destination beam;

where the information of a plurality of beams supported by the apparatus and information of channel resources reserved for the plurality of beams are configured in the terminal.

In an embodiment, the receiving unit is further configured to receive information of successful switching of the destination beam through the destination beam.

In an embodiment, the releasing unit is further configured to:

release the channel resources reserved for the destination beam in response to determining that the terminal does not switch again within a preset duration after the terminal switches to the destination beam.

In an embodiment, in response to determining that the information of the destination beam includes information of two or more destination beams, the priority is set for the two or more destination beams.

In an embodiment, the information of the destination beam includes at least one of:

carrier information of the destination beam, bandwidth part (BWP) information, and identification information of the destination beam.

In an example, a sending unit 41, a receiving unit, a releasing unit, a broadcast unit, a configuration unit, etc. may be implemented by one or more of a central processing unit (CPU), a graphics processing unit (GPU), a baseband processor (BP), an application specific integrated circuit (ASIC), a DSP, a programmable logic device (PLD), a complex programmable logic device (CPLD), a field-programmable gate array (FPGA), a general processor, a controller, a micro controller unit (MCU), a microprocessor, or other electronic elements, and may also be implemented in conjunction with one or more radio frequency (RF) antennas for implementing the beam switching method of the foregoing embodiments.

In the embodiments of the present disclosure, with regard to the beam switching apparatus shown in FIG. 4, the specific manners in which various units perform operations have been described in detail in the embodiments relating to the method, and details are not described here.

Figure 5:
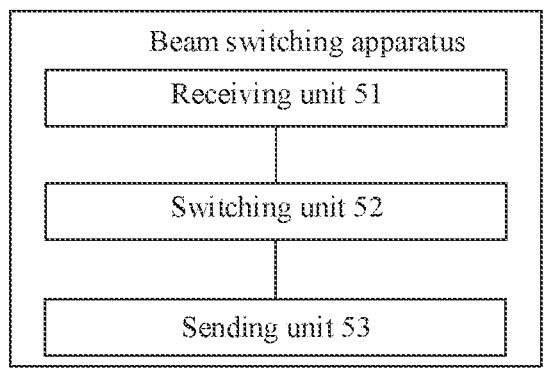
FIG. 5 is a schematic structural diagram of a configuration of a beam switching apparatus according to an example.

FIG. 5 is a schematic structural diagram of a configuration of a beam switching apparatus according to an example. As shown in FIG. 5, the beam switching apparatus according to the embodiments of the present disclosure includes:

a receiving unit 51, configured to receive beam switching information sent by a network device;

a switching unit 52, configured to perform switching based on information of a beam switching requirement and/or a destination beam in the beam switching information; and a sending unit 53, configured to send information of successful switching of the destination beam to the network device through the switched destination beam or reserved resources of the destination beam.

In an embodiment, information of the reserved channel resources is carried in the beam switching information.

In an embodiment, the receiving unit 51 receives, through a broadcast message of the network device, information of channel resources respectively reserved for all beams supported by the network device.

On the basis of the beam switching apparatus shown in FIG. 5, the beam switching apparatus according to the embodiments of the present disclosure further includes:

a configuration unit (not shown in FIG. 5), configured with information of all beams supported by the network device and information of channel resources reserved for all beams.

In response to determining that the information of the destination beam includes information of two or more destination beams, switching to the destination beam is performed based on the priority of the two or more destination beams, or switching to one of the two or more destination beams randomly is performed.

In an example, a receiving unit 51, a switching unit 52, a sending unit 53, a configuration unit, etc. may be implemented by one or more of a central processing unit (CPU), a graphics processing unit (GPU), a baseband processor (BP), an application specific integrated circuit (ASIC), a DSP, a programmable logic device (PLD), a complex programmable logic device (CPLD), a field-programmable gate array (FPGA), a general processor, a controller, a micro controller unit (MCU), a microprocessor, or other electronic elements, and may also be implemented in conjunction with one or more radio frequency (RF) antennas for implementing the beam switching method of the foregoing embodiments.

In the embodiments of the present disclosure, with regard to the beam switching apparatus shown in FIG. 5, the specific manners in which various units perform operations have been described in detail in the embodiments relating to the method, and details are not described here.

Figure 6:
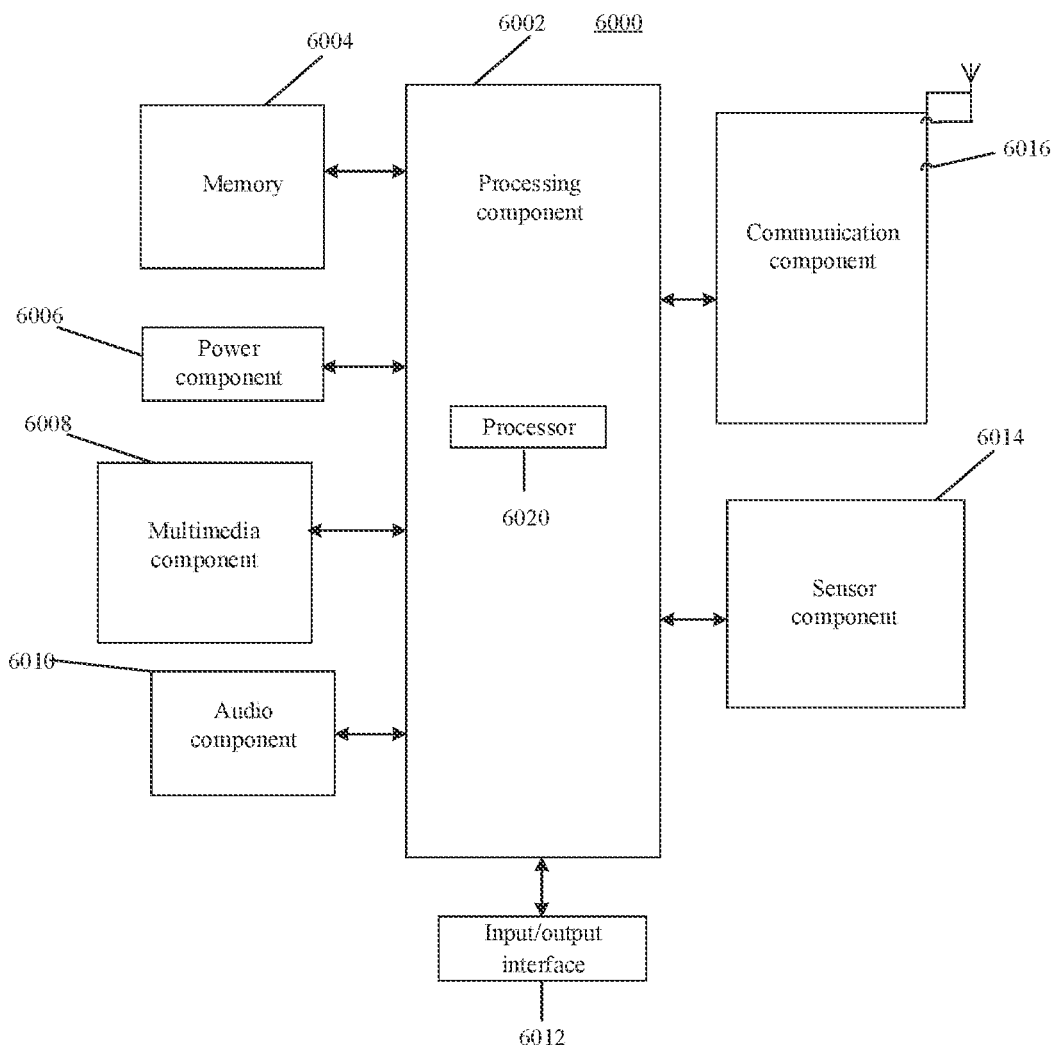
FIG. 6 is a schematic structural diagram of a configuration of a terminal according to an example.

FIG. 6 is a block diagram of a terminal 6000 according to an example. For example, the terminal 6000 may be a mobile phone, a computer, a digital broadcasting terminal, a messaging device, a game console, a tablet device, a medical device, a fitness device, a personal digital assistant, etc.

Referring to FIG. 6, the terminal 6000 may include one or more of the following components: a processing component 6002, a memory 6004, a power component 6006, a multimedia component 6008, an audio component 6010, an input/output (I/O) interface 6012, a sensor component 6014, and a communication component 6016.

The processing component 6002 usually controls the overall operations of the terminal 6000, such as operations associated with display, telephone call, data communication, camera operations and recording operations. The processing component 6002 may include one or more processors 6020 to execute instructions to complete all of or part of the steps of the above method. In addition, the processing component 6002 may include one or more modules to facilitate the interaction between the processing component 6002 and other components. For example, the processing component 6002 may include a multimedia module to facilitate interaction between the multimedia component 6008 and the processing component 6002.

The memory 6004 is configured to store various types of data to support the operations at the device 6000. Examples of these data include instructions for any application or method operated on the terminal 6000, contact data, phone book data, messages, pictures, videos, etc. The memory 6004 may be implemented by any type of volatile or non-volatile storage device or a combination of them, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk.

The power component 6006 provides power for various components of the terminal 6000. The power component 6006 may include a power management system, one or more power sources, and other components associated with power generation, management and distribution of the terminal 6000.

The multimedia component 6008 includes a screen for providing an output interface between the terminal 6000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of a touch or slide, but also the duration and pressure associated with the touch or slide. In some embodiments, the multimedia component 6008 includes a front camera and/or a rear camera. When the device 6000 is in an operation mode, such as a shooting mode or a video mode, the front camera and/or the rear camera may receive external multimedia data. Each front or rear camera may be a fixed optical lens system or have a focal length and optical zoom capability.

The audio component 6010 is configured to output and/or input an audio signal. For example, the audio component 6010 includes a microphone (MIC), and when the terminal 6000 is in the operation mode, such as a call mode, a recording mode and a voice recognition mode, the microphone is configured to receive external audio signals. The received audio signal may be further stored in the memory 6004 or sent by the communication component 6016. In some embodiments, the audio component 6010 further includes a speaker for outputting audio signals.

The I/O interface 6012 provides an interface between the processing component 6002 and a peripheral interface module. The peripheral interface module may be a keyboard, a click wheel, buttons, etc. These buttons may include, but are not limited to a home button, a volume button, a start button, and a lock button.

The sensor component 6014 includes one or more sensors for providing status assessment for the terminal 6000 in various aspects. For example, the sensor component 6014 may detect an on/off state of the terminal 6000, and relative positions of components such as a display and a keypad of the terminal 6000. The sensor component 6014 may also detect a position change of the terminal 6000 or one component of the terminal 6000, presence or absence of contact between the user and the terminal 6000, an orientation or acceleration/deceleration of the terminal 6000 and a temperature change of the terminal 6000. The sensor component 6014 may include a proximity sensor configured to detect the presence of nearby objects without any physical contact. The sensor component 6014 may also include an optical sensor, such as a CMOS or CCD image sensor, for use in imaging applications. In some examples, the sensor component 6014 may further include an acceleration sensor, a gyroscope sensor, a magnetic sensor, a pressure sensor, or a temperature sensor.

The communication component 6016 is configured to facilitate wired or wireless communication between the terminal 6000 and other devices. The terminal 6000 may access a wireless network based on communication standards, such as Wi-Fi, 2G or 3G, or a combination of them. In an example, the communication component 6016 receives broadcast signals or broadcast associated information from an external broadcast management system through a broadcast channel. In an example, the communication component 6016 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the terminal 6000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to perform the above beam switching method.

In an example, there is further provided a non-transitory computer-readable storage medium including instructions, such as a memory 6004 including instructions executable by the processor 6020 of the terminal 6000 to complete the above beam switching method. For example, the non-transitory computer-readable storage medium may be an ROM, a random access memory (RAM), a CD-ROM, a magnetic tape, a floppy disk, an optical data storage device, etc.

The embodiments of the present disclosure further record a network device, including a processor, a transceiver, a memory, and executable programs stored in the memory and may be executed by the processor, where when the executable programs are executed by the processor, the steps of the beam switching method according to the foregoing embodiments are implemented.

The embodiments of the present disclosure further record a terminal, including a processor, a transceiver, a memory, and executable programs stored in the memory and may be executed by the processor, where when the executable programs are run by the processor, the steps of the beam switching method according to the foregoing embodiments are implemented.

The embodiments of the present disclosure further record a non-transitory computer-readable storage medium storing executable programs, where when the executable programs are executed by a processor, the steps of the beam switching method according to the foregoing embodiments are implemented.

Additional non-limiting embodiments of the disclosure include:

1. A beam switching method, including:
    sending, by a network device, beam switching information to a terminal according to position information and channel measurement information of the terminal, where the beam switching information includes information of a beam switching requirement and/or a destination beam.

2. The method according to embodiment 1, where the method further includes:
receiving, by the network device, information, sent by the terminal, of successful switching of the destination beam and releasing channel resources occupied by the terminal before switching to the destination beam.

3. The method according to embodiment 1, where the beam switching information further includes information of channel resources reserved for the destination beam.

4. The method according to embodiment 2, where receiving, by the network device, information, sent by the terminal, of successful switching of the destination beam includes:
receiving, by the network device, information of successful switching of the destination beam through reserved channel resources.

5. The method according to embodiment 3, where the method further includes:
determining, by the network device, information of the channel resources reserved for the destination beam according to at least one of service information of the terminal and resource occupation information of the destination beam.

6. The method according to embodiment 2, where the method further includes:
broadcasting, by the network device, through a broadcast channel, information of channel resources respectively reserved for a plurality of beams supported by the network device; and
receiving, by the network device, information, sent by the terminal, of successful switching of the destination beam includes:
receiving, by the network device, information of successful switching of the destination beam through the reserved channel resources.

7. The method according to embodiment 2, where receiving, by the network device, information, sent by the terminal, of successful switching of the destination beam includes:
receiving, by the network device, information of successful switching of the destination beam through the channel resources reserved for the destination beam;
where information of a plurality of beams supported by the network device and information of channel resources reserved for the plurality of beams being configured in the terminal.

8. The method according to embodiment 2, where receiving, by the network device, information, sent by the terminal, of successful switching of the destination beam includes:
receiving, by the network device, information of successful switching of the destination beam through the destination beam.

9. The method according to any one of embodiments 3-8, where the method further includes:
releasing, by the network device, the channel resources reserved for the destination beam in response to determining that the terminal does not switch again within a preset duration after the terminal switches to the destination beam.

10. The method according to any one of embodiments 1-9, where when the information of the destination beam includes information of two or more destination beams, the priority is set for the two or more destination beams.

11. The method according to any one of embodiments 1-9, where the information of the destination beam includes at least one of:

carrier information of the destination beam, BWP information, and identification information of the destination beam.

12. A beam switching method, including:
receiving, by a terminal, beam switching information sent by a network device, and performing switching based on information of a beam switching requirement and/or a destination beam in the beam switching information; and
sending, by the terminal, information of successful switching of the destination beam to the network device through the switched destination beam or reserved resources of the destination beam.

13. The method according to embodiment 12, where information of the reserved channel resources is carried in the beam switching information.

14. The method according to embodiment 12, where the method further includes:
receiving, by the terminal, through a broadcast message of the network device, information of channel resources respectively reserved for all beams supported by the network device.

15. The method according to embodiment 12, where the terminal is configured with information of all beams supported by the network device and information of channel resources reserved for all beams.

16. The method according to embodiment 12, where the information of the destination beam includes information of two or more destination beams, switching to the destination beam is performed based on the priority of the two or more destination beams, or switching to one of the two or more destination beams randomly is performed.

17. A beam switching apparatus, including:
a sending unit, configured to send beam switching information to a terminal according to position information and channel measurement information of the terminal, where the beam switching information includes information of a beam switching requirement and/or a destination beam.

18. The apparatus according to embodiment 17, where the apparatus further includes:
a receiving unit, configured to receive information, sent by the terminal, of successful switching of the destination beam; and
a releasing unit, configured to release channel resources occupied by the terminal before switching to the destination beam.

19. The apparatus according to embodiment 17, where the beam switching information further includes information of channel resources reserved for the destination beam.

20. The apparatus according to embodiment 18, where the receiving unit is further configured to:
receive information of successful switching of the destination beam through the reserved channel resources.

21. The apparatus according to embodiment 20, where the apparatus further includes:
a determination unit, configured to determine information of channel resources reserved for the destination beam according to at least one of service information of the terminal and resource occupation information of the destination beam.

22. The apparatus according to embodiment 18, where the apparatus further includes:
a broadcast unit, configured to broadcast, through a broadcast channel, information of channel resources respectively reserved for a plurality of beams supported by the apparatus; and the receiving unit, further configured to receive information of successful switching of the destination beam through the reserved channel resources.

23. The apparatus according to embodiment 18, where the apparatus further includes: a configuration unit; and
the receiving unit, further configured to:
receive information of successful switching of the destination beam through the channel resources reserved for the destination beam;
where information of a plurality of beams supported by the apparatus and information of channel resources reserved for the plurality of beams are configured in the terminal.

24. The apparatus according to embodiment 18, where the receiving unit is further configured to receive information of successful switching of the destination beam through the destination beam.

25. The apparatus according to any one of embodiments 19-24, where the releasing unit is further configured to:
release the channel resources reserved for the destination beam in response to determining that the terminal does not switch again within a set duration after the terminal switches to the destination beam.

26. The apparatus according to any one of embodiments 17-25, where when the information of the destination beam includes information of two or more destination beams, the priority is set for the two or more destination beams.

27. The apparatus according to any one of embodiments 17-25, where the information of the destination beam includes at least one of:
carrier information of the destination beam, bandwidth part (BWP) information, and identification information of the destination beam.

28. A beam switching apparatus, including:
a receiving unit, configured to receive beam switching information sent by a network device;
a switching unit, configured to perform switching based on information of a beam switching requirement and/or a destination beam in the beam switching information; and
a sending unit, configured to send information of successful switching of the destination beam to the network device through the switched destination beam or reserved resources of the destination beam.

29. The apparatus according to embodiment 28, where information of the reserved channel resources is carried in the beam switching information.

30. The apparatus according to embodiment 28, where the receiving unit receives, through a broadcast message of the network device, information of channel resources respectively reserved for all beams supported by the network device.

31. The apparatus according to embodiment 28, where the apparatus further includes:
a configuration unit, configured with information of all beams supported by the network device and information of channel resources reserved for all beams.

32. The apparatus according to any one of embodiments 28-31, where the information of the destination beam includes information of two or more destination beams, switching to the destination beam is performed based on the priority of the two or more destination beams, or switching to one of the two or more destination beams randomly is performed.

A person skilled in the art would readily conceive of other implementations of the embodiments of the present disclosure after considering the specification and practicing the disclosure disclosed herein. The present disclosure is intended to cover any variations, uses or adaptive changes of the embodiments of the present disclosure. These variations, uses or adaptive changes follow the general principle of the embodiments of the present disclosure and include common general knowledge or conventional technical means in the technical field that are not disclosed in the embodiments of the present disclosure. The specification and the embodiments are merely regarded as examples, and the real scope and spirit of the embodiments of the present disclosure are pointed out by the following claims.

It should be understood that the embodiments of the present disclosure are not limited to the precise structure described above and shown in the figures, and various modifications and changes can be made without departing from its scope. The scope of the embodiments of the present disclosure is only limited by the appended claims.

The invention claimed is:
1. A beam switching method, comprising:
sending, by a network device, beam switching information to a terminal; wherein the beam switching information comprises information of a beam switching requirement and/or a destination beam; wherein the beam switching information further comprises information of channel resources reserved for the destination beam, and the information of channel resources reserved for the destination beam is determined according to service information of the terminal and resource occupation information of the destination beam by the network device; and wherein the service information of the terminal comprises a service bandwidth occupation before the terminal switching, and the resource occupation information of the destination beam comprises a remaining bandwidth of the destination beam for supporting service communication of the terminal; and
releasing, by the network device, the channel resources reserved for the destination beam in response to determining that the terminal does not switch again within a preset duration after the terminal switches to the destination beam.

2. The beam switching method according to claim 1, wherein the beam switching method further comprises:
receiving, by the network device, information, sent by the terminal, of successful switching of the destination beam and releasing channel resources occupied by the terminal before switching to the destination beam.

3. The beam switching method according to claim 2, wherein receiving, by the network device, information, sent by the terminal, of successful switching of the destination beam comprises:
receiving, by the network device, information of successful switching of the destination beam through reserved channel resources.

4. The beam switching method according to claim 2, wherein the beam switching method further comprises:
broadcasting, by the network device, through a broadcast channel, information of channel resources respectively reserved for at least two beams supported by the network device;
receiving, by the network device, information, sent by the terminal, of successful switching of the destination beam comprises:
receiving, by the network device, information of successful switching of the destination beam through reserved channel resources.

5. The beam switching method according to claim 2, wherein receiving, by the network device, information, sent by the terminal, of successful switching of the destination beam comprises:
- receiving, by the network device, information of successful switching of the destination beam through the channel resources reserved for the destination beam;
- wherein information of at least two beams supported by the network device and/or information of the channel resources reserved for the at least two beams being configured in the terminal.

6. The beam switching method according to claim 2, wherein receiving, by the network device, information, sent by the terminal, of successful switching of the destination beam comprises:
- receiving, by the network device, information of successful switching of the destination beam through the destination beam.

7. The beam switching method according to claim 1, wherein when the information of the destination beam comprises information of two or more destination beams, a priority is set for the two or more destination beams.

8. The beam switching method according to claim 1, wherein the information of the destination beam comprises at least one of:
- carrier information;
- bandwidth part (BWP) information; and
- identification information.

9. A beam switching method, comprising:
- receiving, by a terminal, beam switching information sent by a network device, and switching based on information of a beam switching requirement and/or a destination beam in the beam switching information, wherein the beam switching information further comprises information of channel resources reserved for the destination beam; and
- sending, by the terminal, information of successful switching of the destination beam to the network device through the channel resources reserved for the destination beam,
- wherein the information of channel resources reserved for the destination beam is determined according to service information of the terminal and resource occupation information of the destination beam by the network device, wherein the service information of the terminal comprises a service bandwidth occupation before the terminal switching, and the resource occupation information of the destination beam comprises a remaining bandwidth of the destination beam for supporting service communication of the terminal, and wherein the channel resources reserved for the destination beam is released by the network device in response to determining that the terminal does not switch again within a preset duration after the terminal switches to the destination beam.

10. The beam switching method according to claim 9, wherein the beam switching method further comprises:
- receiving, by the terminal, through a broadcast message of the network device, information of channel resources respectively reserved for at least two beams supported by the network device.

11. The beam switching method according to claim 9, wherein the terminal is configured with information of at least two beams supported by the network device and/or information of channel resources reserved for at least two beams.

12. The beam switching method according to claim 9, wherein the information of the destination beam comprises information of at least two destination beams, switching to one of the at least two destination beams is performed based on a priority of the at least two destination beams, or switching to one of the at least two destination beams randomly is performed.

13. A network device, comprising a processor, a transceiver, a memory, and executable programs stored in the memory and may be run by the processor, wherein the processor, when running the executable programs, is enabled to:
- send beam switching information to a terminal; wherein the beam switching information comprises information of a beam switching requirement and/or a destination beam; wherein the beam switching information further comprises information of channel resources reserved for the destination beam, and the information of channel resources reserved for the destination beam is determined according to service information of the terminal and resource occupation information of the destination beam by the network device; and wherein the service information of the terminal comprises a service bandwidth occupation before the terminal switching, and the resource occupation information of the destination beam comprises a remaining bandwidth of the destination beam for supporting service communication of the terminal; and
- release the channel resources reserved for the destination beam in response to determining that the terminal does not switch again within a preset duration after the terminal switches to the destination beam.

14. A terminal, comprising a processor, a transceiver, a memory, and executable programs stored in the memory that may be run by the processor, wherein when the executable programs are run by the processor, the beam switching method according to claim 9 is implemented.

15. A non-transitory computer-readable storage medium storing executable programs, wherein when the executable programs are executed by a processor, the beam switching method according to claim 1 is implemented.

16. A non-transitory computer-readable storage medium storing executable programs, wherein when the executable programs are executed by a processor, the beam switching method according to claim 9 is implemented.

17. The beam switching method according to claim 1, wherein the beam switching method further comprises:
- releasing, by the network device, the channel resources reserved for the destination beam, in response to determining that information of successful switching of the destination beam is not received within the preset duration.

18. The beam switching method according to claim 9, wherein switching based on the information of the beam switching requirement and/or the destination beam in the beam switching information comprises:
- switching according to information of frequency band supported by the terminal or information of beam frequency band acquired through measurement detection, in response to determining that the beam switching information comprises the information of the beam switching requirement but does not comprise the information of the destination beam.

19. The beam switching method according to claim 1, wherein a start time of the preset duration is started when the network device sends the beam switching information to the terminal.

20. The beam switching method according to claim 9, wherein a start time of the preset duration is started when the network device sends the beam switching information to the terminal.

\* \* \* \* \*